May 24, 1938.  R. OPPENHEIM  2,118,712
PRIMARY CELL
Filed April 4, 1934  2 Sheets-Sheet 1

R. Oppenheim
INVENTOR

By: Marks & Clerk
Attys.

May 24, 1938.    R. OPPENHEIM    2,118,712
PRIMARY CELL
Filed April 4, 1934    2 Sheets—Sheet 2

R. Oppenheim
inventor

By: Glascock Downing & Seebold
Attys.

Patented May 24, 1938

2,118,712

UNITED STATES PATENT OFFICE 2,118,712

PRIMARY CELL

René Oppenheim, Gennevilliers, France, assignor to Société Anonyme Le Carbone, Gennevilliers, France Application April 4, 1934, Serial No. 718,981
In France December 12, 1933

7 Claims. (Cl. 136—100)

The present invention relates to primary cells and more particularly to the electrode arrangement of such cells including the connections thereof.

When electric primary cells are connected as a battery, in series or in series-parallel, it sometimes happens that the voltage of one or more elements becomes reversed whilst these elements are not yet exhausted.

This phenomenon is due to an abnormal increase of the internal resistance of the elements which become reversed.

This increase of internal resistance can arise from various causes: polarization of the positive electrode, drying up on the electrolyte of cells of the solid electrolyte type, etc.

It has been found that, in certain cases, this phenomenon could be considered as a "polarization" of the soluble or negative electrode. In other words, the oxygen which, in the normal operation of the element, combines with the soluble electrode, usually made of zinc, can sometimes adhere to this electrode in the form of a thin insulating film. This then causes not only an interruption in the production of current by the element thus insulated, but also a resistance to the passage of the current supplied by the other elements, resulting in the "reversal of polarity" which can be noticed.

The present invention is adapted to remedy this inconvenience and substantially consists in adding to the ordinary elements of the cell one or more auxiliary electrodes, of the same nature as the soluble electrode or of different nature, and electrically connected to the soluble electrode either directly, or through the medium of a resistance. Experience shows that these auxiliary electrodes have for effect to prevent the above mentioned perturbation in the operation from taking place.

A form of construction of an electric cell thus improved will be described hereinafter, by way of example and not in a limiting sense.

This form of construction is diagrammatically illustrated in the accompanying drawings, in which.

Figure 1:
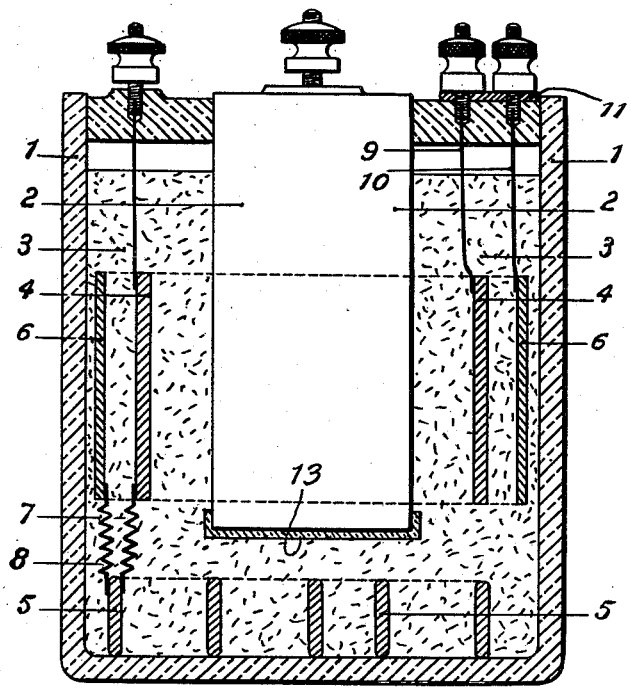
Fig. 1 is a view partly in section and partly in elevation showing a cell according to the invention.
Figure 2:
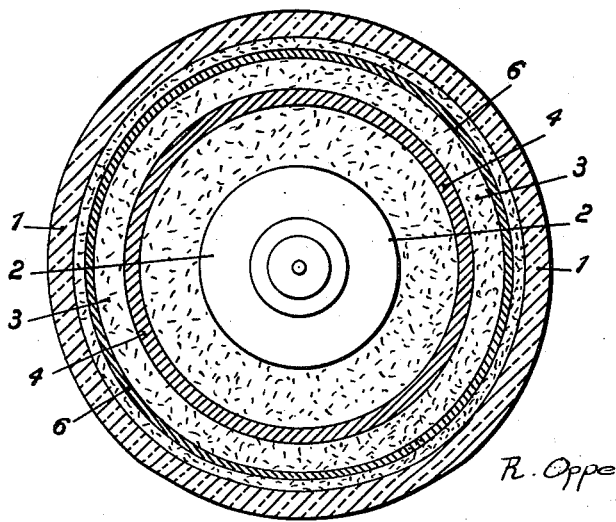
Fig. 2 is a plan view, partly in section, taken from the end of the same cell.

As illustrated in the drawings, 1 designates the jar containing the cell, 2 is the insoluble electrode, made for instance of porous carbon, and the bottom of which is preferably insulated as at 13 from the electrolyte, 3 is the electrolyte which can be made solid in a suitable manner, 4 is the soluble electrode having for instance the shape of a cylinder, formed of zinc. The cylinder may be slotted or shaped with a solid wall.

A first auxiliary electrode 5 is arranged at the bottom of the cell underneath the positive element. It is constituted, for instance, by a zinc spiral. A second auxiliary electrode 6 can be placed in proximity to the main electrode 4, and can, for instance, be in the shape of a zinc cylinder concentric with the main electrode.

Figure 3:
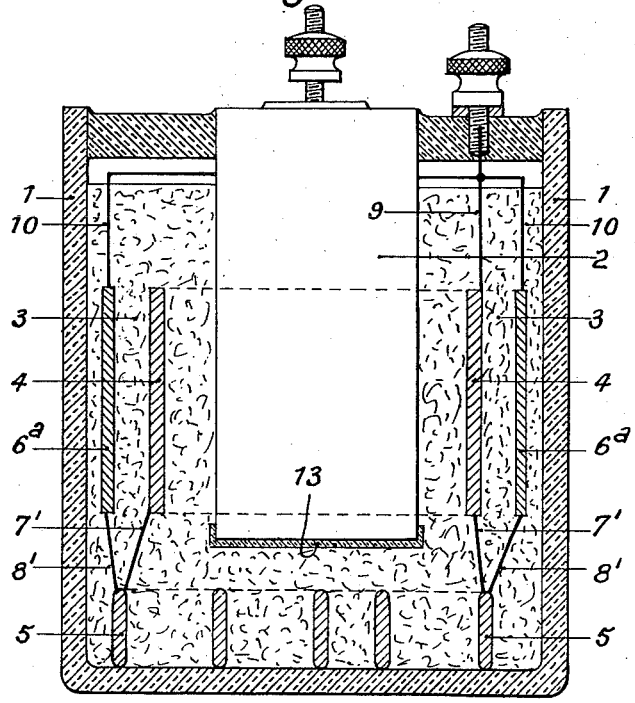
Figure 3 is a view similar to Figure 1 showing a modified cell.

The main electrode 4 is connected to the first auxiliary electrode 5 by a resistor 7, and this first auxiliary electrode is itself connected by the resistor 8 to the second auxiliary electrode 6. These connections may also take the form of conductors 7' and 8' as shown in Figure 3.

During the operation of the cell, the composition of the electrolyte varies, so that the electrodes 4 and 5, on the one hand, and 5 and 6, on the other hand, are immersed in zones of the electrolyte the concentration of which is different, this having the effect of eliminating the insulating film which tends to form on the main electrode.

Figure 4:
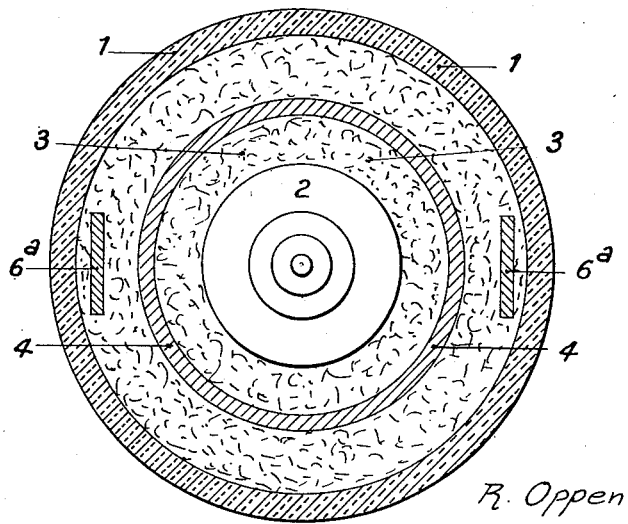
Figure 4 is a top plan view of the device shown in Figure 3 illustrating some of the electrodes in section.

Experience has shown that very satisfactory results can still be obtained by using only one of the auxiliary electrodes, either the electrode 5 at the bottom of the jar, or the zinc cylinder 6 concentric with the main electrode. It is not even indispensable that this latter zinc element should completely surround the main zinc element. For example there is shown in Figures 3 and 4 simple blade electrodes 6ª which are positioned outside the main zinc element 4. These electrodes 6ª are connected to the main element 4 by the wires 9 and 10 as shown in Figure 3 to ensure the depolarization of the main electrode.

Finally, in certain cases, it may be advantageous that the auxiliary electrode should not be connected to the main electrode by a conductor of negligible resistance. Conductors 9, 10 can then be caused to issue from the element and can be connected to both electrodes, and the ends of these two conductors can be connected by means of a resistance 11 as shown in Fig. 1, thus limiting the current circulating between the two electrodes.

The above arrangements are of course given by way of example only; all constructional details, shapes, dimensions and materials used can vary according to circumstances without departing thereby from the principle of the invention.

What I claim as my invention and desire to secure by Letters Patent is:—

1. In a primary cell, a depolarizing insoluble electrode, with bottom insulated from electrolyte, a principal soluble electrode having an active face situated directly opposite an active face of the insoluble electrode and separated therefrom by a practically constant thickness of electrolyte, said principal electrode being entirely immersed in the electrolyte surrounding it on all sides, auxiliary soluble electrodes electrically connected to the principal electrode and also immersed in the electrolyte, but not situated opposite an active face of the insoluble electrode one of said auxiliary electrodes facing said insulated bottom.

2. In a primary cell, a depolarizing insoluble electrode, a principal soluble electrode having an active face situated directly opposite an active face of the insoluble electrode and separated therefrom by a practically constant thickness of electrolyte, said principal electrode being entirely immersed in the electrolyte, an auxiliary soluble electrode immersed in the electrolyte below the principal soluble electrode and the insoluble electrode, a second auxiliary soluble electrode immersed in the electrolyte in such a manner that it is separated from the insoluble electrode by the principal soluble electrode, said principal and auxiliary electrodes being electrically connected.

3. In a primary cell, a depolarizing insoluble electrode with bottom insulated from electrolyte, a principal soluble electrode having an active face situated directly opposite an active face of the insoluble electrode and separated therefrom by a practically constant thickness of electrolyte, said principal electrode being entirely immersed in the electrolyte surrounding it on all sides, auxiliary soluble electrodes electrically connected to the principal electrode and also immersed in the electrolyte, one of said auxiliary electrodes positioned below said insulated bottom, the other of said auxiliary soluble electrodes lying opposite the other face of the principal electrode.

4. In a primary cell, a depolarizing insoluble electrode, the bottom surface of which is insulated from the electrolyte, a principal soluble electrode having an active face situated directly opposite an active face of the insoluble electrode and separated therefrom by a practically constant thickness of electrolyte, said principal electrode being entirely immersed in the electrolyte, an auxiliary soluble electrode immersed in the electrolyte below the principal soluble electrode and the insoluble electrode, a second auxiliary soluble electrode immersed in the electrolyte in such a manner that it is separated from the insoluble electrode by the principal soluble electrode, said principal and auxiliary electrodes being electrically connected.

5. In a primary cell, a depolarizing insoluble electrode, a principal soluble electrode having an active face situated directly opposite an active face of the insoluble electrode and separated therefrom by a practically constant thickness of electrolyte, said principal electrode being entirely immersed in the electrolyte, an auxiliary soluble electrode in the form of a spiral immersed in the electrolyte below the principal soluble electrode and the insoluble electrode, a second auxiliary soluble electrode immersed in the electrolyte in such a manner that it is separated from the insoluble electrode by the principal soluble electrode, said principal and auxiliary electrodes being electrically connected.

6. In a primary cell, a depolarizing insoluble electrode, a principal soluble electrode, said electrode having an active face situated directly opposite an active face of the insoluble electrode and separated therefrom by a practically constant thickness of electrolyte, said principal electrode being entirely immersed in the electrolyte, an auxiliary soluble electrode immersed in the electrolyte below the principal soluble electrode and the insoluble electrode, a second auxiliary soluble electrode constituted by blades of metal immersed in the electrolyte in such a manner that it is separated from the insoluble electrode by the principal soluble electrode, said principal and auxiliary electrodes being electrically connected.

7. In a primary cell, a depolarizing insoluble electrode, a principal soluble electrode having an active face situated directly opposite an active face of the insoluble electrode and separated therefrom by a practically constant thickness of electrolyte, said principal electrode being entirely immersed in the electrolyte, an auxiliary soluble electrode immersed in the electrolyte below the principal soluble electrode and the insoluble electrode, a second auxiliary soluble electrode immersed in the electrolyte in such a manner that it is separated from the insoluble electrode by the principal soluble electrode and resistances electrically connecting said principal and auxiliary electrodes.

RENÉ OPPENHEIM.